United States Patent
Koo et al.

(10) Patent No.: US 8,279,825 B2
(45) Date of Patent: Oct. 2, 2012

(54) METHOD FOR TRANSMITTING CHANNEL STATE INFORMATION IN A WIRELESS COMMUNICATION SYSTEM

(75) Inventors: Ja Ho Koo, Gyeonggi-do (KR); Wook Bong Lee, Gyeonggi-do (KR); Jian Xu, Gyeonggi-do (KR); Bin Chul Ihm, Gyeonggi-do (KR); Hyun Soo Ko, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 348 days.

(21) Appl. No.: 12/757,586

(22) Filed: Apr. 9, 2010

(65) Prior Publication Data

US 2010/0265901 A1 Oct. 21, 2010

Related U.S. Application Data

(60) Provisional application No. 61/168,226, filed on Apr. 10, 2009.

(30) Foreign Application Priority Data

Dec. 9, 2009 (KR) ........................ 10-2009-0121786

(51) Int. Cl.
*H04W 72/04* (2009.01)

(52) U.S. Cl. ........................................ 370/329; 370/332

(58) Field of Classification Search ................. 370/332; 455/562.1; 375/343, 219
See application file for complete search history.

(56) References Cited

U.S. PATENT DOCUMENTS

| 7,751,368 B2 * | 7/2010 | Li et al. ......................... 370/332 |
| 2007/0015545 A1 * | 1/2007 | Leifer et al. ............... 455/562.1 |
| 2010/0238984 A1 * | 9/2010 | Sayana et al. ................. 375/219 |
| 2011/0255641 A1 * | 10/2011 | Lopez ............................ 375/343 |

* cited by examiner

*Primary Examiner* — Andrew Lai
*Assistant Examiner* — Syed M Bokhari
(74) *Attorney, Agent, or Firm* — Morgan, Lewis & Bockius LLP

(57) ABSTRACT

A method for transmitting channel state information from an user equipment in a wireless communication system is disclosed. The user equipment transmits a spatial channel matrix or a spatial channel covariance matrix irrespective of a feedback type. The user equipment is able to additionally transmit noise plus interference variance information of a whole bandwidth used for the channel state information. In this case, the user equipment is able to transmit normalized spatial channel matrix or spatial channel covariance matrix and normalized noise plus interference variance information for accurate and efficient transmission of the channel state information. The user equipment receives an allocation of an uplink resource from a base station and is then able to map the spatial channel matrix or the spatial channel covariance matrix to the allocated resource according to a specific pattern.

12 Claims, 14 Drawing Sheets

METHOD FOR TRANSMITTING CHANNEL STATE INFORMATION IN A WIRELESS COMMUNICATION SYSTEM

CROSS-REFERENCE TO RELATED APPLICATIONS

Pursuant to 35 U.S.C §119 (e), This application claims the benefit of earlier filing date and right of priority to provisional Application No. 61/168,226, filed on Apr. 10, 2009, and the Korean Patent Application No. 10-2009-0121786, filed on Dec. 9, 2009, the contents of which are incorporated by reference herein in their entirety which is hereby incorporated by reference as if fully set forth herein.

BACKGROUND OF THE INVENTION

1. Field of the Invention

The present invention relates to a wireless communication system, and more particularly, to a method of transmitting channel state information in a wireless communication system.

2. Discussion of the Related Art

Recently, MIMO (multiple input multiple output) system is one of the hottest segments in the wideband wireless communication technology. The MIMO system means the system that can raise communication efficiency of data using multiple antennas. And, the MIMO systems can be categorized into space multiplexing scheme and space diversity scheme according to a presence or non-presence of the same data transmission.

The space multiplexing scheme means the scheme for transmitting data at high speed by transmitting different data via a plurality of transmitting antennas simultaneously without increasing a bandwidth. The space diversity scheme means the scheme for obtaining transmission diversity by transmitting the same data via a plurality of transmitting antennas. Space time channel coding is an example for the space diversity scheme.

The MIMO technique can be also categorized into an open loop scheme and a closed loop scheme according to a presence or non-presence of feedback of channel information to a transmitting side from a receiving side. The open loop scheme includes a space-time trellis code (STTC) scheme for obtaining a transmission diversity and coding gain using BLAST and space region capable of extending an information size amounting to the number of transmitting antennas in a manner that a transmitting side transmits information in parallel and that a receiving side detects a signal using ZF (zero forcing) and MMSE (minimum mean square error) scheme repeatedly. And, the closed loop scheme includes a TxAA (transmit antenna array) scheme or the like.

In the following description, spatial channel matrix usable for the present invention shall be schematically explained.

$$H(i,k) = \begin{bmatrix} h_{1,1}(i,k) & h_{1,2}(i,k) & \ldots & h_{1,Nt}(i,k) \\ h_{2,1}(i,k) & h_{2,2}(i,k) & \ldots & h_{2,Nt}(i,k) \\ \vdots & \vdots & \ddots & \vdots \\ h_{Nr,1}(i,k) & h_{Nr,2}(i,k) & \ldots & h_{Nr,Nt}(i,k) \end{bmatrix}$$

In this matrix, the H(i,k) is a spatial channel matrix, the Nr indicates the number of receiving antennas, the Nt indicates the number of transmitting antennas, the r indicates an index of a receiving antenna, the t indicates an index of a transmitting antenna, the i indicates an index of an OFDM or SC-FDMA symbol, and the k indicates an index of a subcarrier. The $h_{r,t}(i,k)$ is an element of the channel matrix H(i,k) and means an $r^{th}$ channel state and a $t^{th}$ antenna on an $i^{th}$ symbol and a $k^{th}$ subcarrier.

Spatial channel covariance matrix usable for the present invention is schematically explained as follows. The spatial channel covariance matrix can be represented as a symbol R.

$$R = E[H_{i,k} H_{i,k}^H]$$

In this matrix, the H indicates a spatial channel matrix and the R indicates a spatial channel covariance matrix. The E[ ] means an average, the i indicates a symbol index, and the k indicates a frequency index.

Singular value decomposition (SVD) is one of major methods for decomposing a rectangular matrix and is the scheme frequently used in the fields of signal processing and statistics. The SVD is generated from generalizing the spectrum theory of matrix for an arbitrary rectangular matrix. In case of using the spectrum theory, it is able to decompose an orthogonal square matrix into diagonal matrixes on the base of an eigen value. Assume that a matrix H is an m×m matrix consisting of elements of a set of real or complex numbers. In this case, the matrix H can be represented as multiplications of 3 matrixes shown in the following.

$$H_{m \times n} = U_{m \times m} \Sigma_{m \times n} V_{n \times n}^H$$

In this case, the U and V indicate unitary matrixes, respectively. The Σ indicates m×n diagonal matrix including a singular value that is not negative. The singular value is represented as $\Sigma = \text{diag}(\sigma_1 \ldots \sigma_r)$, $\sigma_i = \sqrt{\lambda_i}$. Thus, the representation of the multiplication of three matrixes is called singular value decomposition. The singular value decomposition can handle more general matrixes rather than the eigen value decomposition capable of decomposing an orthogonal square matrix only. And, the singular value decomposition and the eigen value decomposition are related to each other.

When a matrix H is a positive definite Hermitian matrix, all eigen values of the H are non-negative real numbers. In this case, a singular value and vector of the H become equal to an eigen value and vector of the H, respectively.

Meanwhile, the eigen value decomposition (EVD) can be represented as follows.

$$HH^H = (U\Sigma V^H)(U\Sigma V^H)^H = U\Sigma\Sigma^T U^H$$

$$H^H H = (U\Sigma V^H)(U\Sigma V_H)^H = V\Sigma^T \Sigma V$$

In this case, the eigen value can be set to $\lambda_1, \ldots, \lambda_r$.

SUMMARY OF THE INVENTION

Accordingly, the present invention is directed to a method of transmitting channel state information in a wireless communication system that substantially obviates one or more of the problems due to limitations and disadvantages of the related art.

An object of the present invention is to provide a method of transmitting channel state information in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting channel state information at a user equipment, according to the present invention includes the steps of receiving an allocation of an uplink resource for transmission of the channel state information from a base station (BS); mapping each component corresponding to diagonal elements and upper off-diagonal elements in a spatial channel matrix or a spatial channel covariance matrix to the allocated resource per symbol or subcarrier; nulling a remaining non-mapped part or inserting a garbage value to the remaining non-mapped part; and transmitting the mapped channel state information to the base station, wherein the spatial channel matrix or the spatial channel covariance matrix is symmetric with reference to a diagonal term.

In another aspect of the present invention, an user equipment (UE) for transmitting channel state information in a wireless communication system includes a receiving module for receiving an allocation of an uplink resource for transmission of the channel state information from a base station (BS); a processor for mapping each component corresponding to diagonal elements and upper off-diagonal elements in a spatial channel matrix or a spatial channel covariance matrix to the allocated resource per symbol or subcarrier, for nulling a remaining non-mapped part or inserting a garbage value to the remaining non-mapped part; and a transmitting module for transmitting the mapped channel state information to the base station (BS), wherein the spatial channel matrix or the spatial channel covariance matrix is symmetric with reference to a diagonal term.

According to embodiments of the present invention, channel state information can be transmitted accurately and efficiently.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like and that a base station is a common name of such a random node of a network stage communicating with a terminal as a node B, eNode B, a base station and the like.

In a mobile communication system, a terminal (i.e., an user equipment) is able to receive information in downlink from a base station and is also able to transmit information in uplink. The information received or transmitted by the terminal includes data and various kinds of control informations. And, various kinds of physical channels exist according to types and usages of the information transmitted or received by the terminal.

Figure 1:
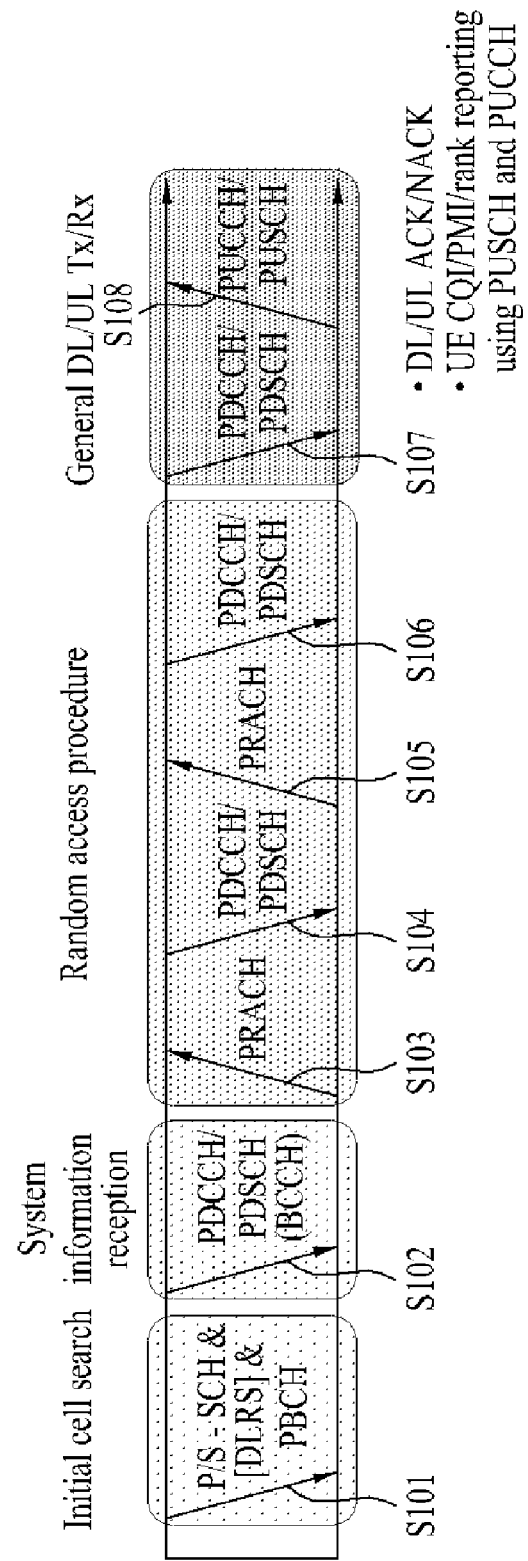
FIG. 1 is a diagram for explaining physical channels used for such a mobile communication system as 3GPP ($3^{rd}$ generation partnership project) LTE (long term evolution) system and a general signal transmitting method using the physical channels.

FIG. 1 is a diagram for explaining physical channels used for such a mobile communication system as 3GPP ($3^{rd}$ generation partnership project) LTE (long term evolution) system and a general signal transmitting method using the physical channels.

Referring to FIG. 1, an user equipment performs initial cell search such as synchronizing with a base station when it newly enters a cell or the power is turned on again (S101). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station.

The user equipment which has finished the initial cell search can acquire more detailed system information by receiving a physical downlink control channel (PDSCH) in accordance with a physical downlink control channel (PDCCH) and information carried in the PDCCH (S102).

Meanwhile, if the user equipment initially accesses the base station, or if there is no radio resource for signal transmission, the user equipment performs a random access procedure for the base station (S103 to S106). To this end, the user equipment transmits a specific sequence as a preamble through a physical random access channel (PRACH) (S103), and receives a response message to the random access through the PDCCH and a PDSCH corresponding to the PDCCH (S104). In case of a contention based random access except handover, such a contention resolution procedure as the physical random access channel transmission 5105 and the PDCCH/PDSCH reception 5106 can be performed additionally.

The user equipment which has performed the aforementioned steps receives the PDCCH/PDSCH (S107) and transmits a physical uplink shared channel (PUSCH) and a physical uplink control channel (PUCCH) (S108), as a procedure of transmitting general uplink/downlink signals. The control information transmitted from the user equipment to the base station or received from the base station to the user equipment through the uplink includes downlink/uplink ACK/NACK signals, a channel quality indicator (hereinafter abbreviated CQI), a precoding matrix index (hereinafter abbreviated PMI), and a rank indicator (hereinafter abbreviated RI). In case of the 3GPP LTE ($3^{rd}$ generation partnership project long term evolution) system, the user equipment can transmit control information of a spatial channel matrix, a spatial channel covariance matrix and the like as well as the aforementioned CQI/PMI/RI through the PUSCH and/or the PUCCH.

A user equipment is able to report channel state information (hereinafter abbreviated CSI) different from the recommended transmission properties (e.g., CQI, PMI, RI) to a serving base station. In general, CSI feedback schemes are categorized into a quantization CSI feedback scheme and an analog CS feedback scheme. Regardless of the types of the CSI feedback schemes, the CSI reported to the serving base station by the user equipment can include a spatial channel matrix H (hereinafter abbreviated 'channel matrix H', 'matrix H', etc.) or a spatial channel covariance matrix R (hereinafter abbreviated 'covariance matrix R', 'matrix R', etc.). In particular, the user equipment is able to transmit information of the spatial channel matrix H or the spatial channel covariance matrix R as the CSI feedback information to the serving base station and is also able to additionally transmit a noise variance (e.g., an interference level) as well as the information of the spatial channel matrix H or the spatial channel covariance matrix R. Namely, the user equipment is able to transmit a noise plus interference variance to the serving base station together with the value of the spatial channel matrix H or the spatial channel covariance matrix R.

When an user equipment transmits CSI feedback information, in order to transmit CSI information more accurately and efficiently, the user equipment normalizes the CSI and then transmits the normalized CSI to a serving base station. This normalizing method can vary according to a type of the CSI feedback information transmitted by the user equipment.

In the following description, explained is a method that a user equipment normalizes and transmits analog CSI feedback information.

First of all, when an user equipment transmits analog CSI feedback information, the user equipment is ale to normalize channel matrix H and noise plus interference variance values through a total power sum of all symbols corresponding to an uplink resource allocated to the user equipment. After a matrix component has been loaded in the uplink resource allocated to the corresponding user equipment, normalization can be performed using a power sum of one symbol having a biggest power value among the symbols.

For instance, assume that M subbands in best channel state (i.e., M=3) are allocated to a user equipment. And, assume that the user equipment is able to report channel matrix H and/or covariance matrix R for the M best subbands and a noise plus interference variance value to a base station. In this case, the each matrix R and noise plus interference variance can be normalized as Formula 1.

$$\hat{R}(1) = \frac{R(1)}{\mu}, \hat{R}(2) = \frac{R(2)}{\mu}, \hat{R}(3) = \frac{R(3)}{\mu},$$

$$\hat{\sigma}^2(1) = \frac{\sigma^2(1)}{\mu}, \hat{\sigma}^2(2) = \frac{\sigma^2(2)}{\mu}, \hat{\sigma}^2(3) = \frac{\sigma^2(3)}{\mu}$$

[Formula 1]

In Formula 1, a value of the µ can become a total power sum or a power value of a specific symbol having a biggest power.

The base station is able to derive $$R(m) = \hat{R}(m) \times \mu,$$
$$\sigma^2(m) = \hat{\sigma}^2(m) \times \mu$$

from Formula 1. Based on the quantized matrix R feedback information normalized as Formula 1, the base station is able to calculate channel capacity of m best subbands (where m=1, 2, ..., M) as shown in Formula 2.

$$C(m) = \log \det\left(I + \frac{1}{\sigma^2(m)} R(m)\right)$$

$$= \log \det\left(I + \frac{1}{\hat{\sigma}^2(m) \times \mu} \mu \times \hat{R}(m)\right)$$

$$= \log \det\left(I + \frac{1}{\hat{\sigma}^2(m)} \hat{R}(m)\right)$$

[Formula 2]

Moreover, the base station is able to find a rank, a precoding matrix (or vector), an MCS (modulation and coding scheme) and the like based on these informations.

In the following description, a method for a user equipment to transmit CSI information by mapping it to an allocated resource is explained. First of all, a resource grid structure used to map the CSI information in LTE system is schematically explained as follows.

Figure 2:
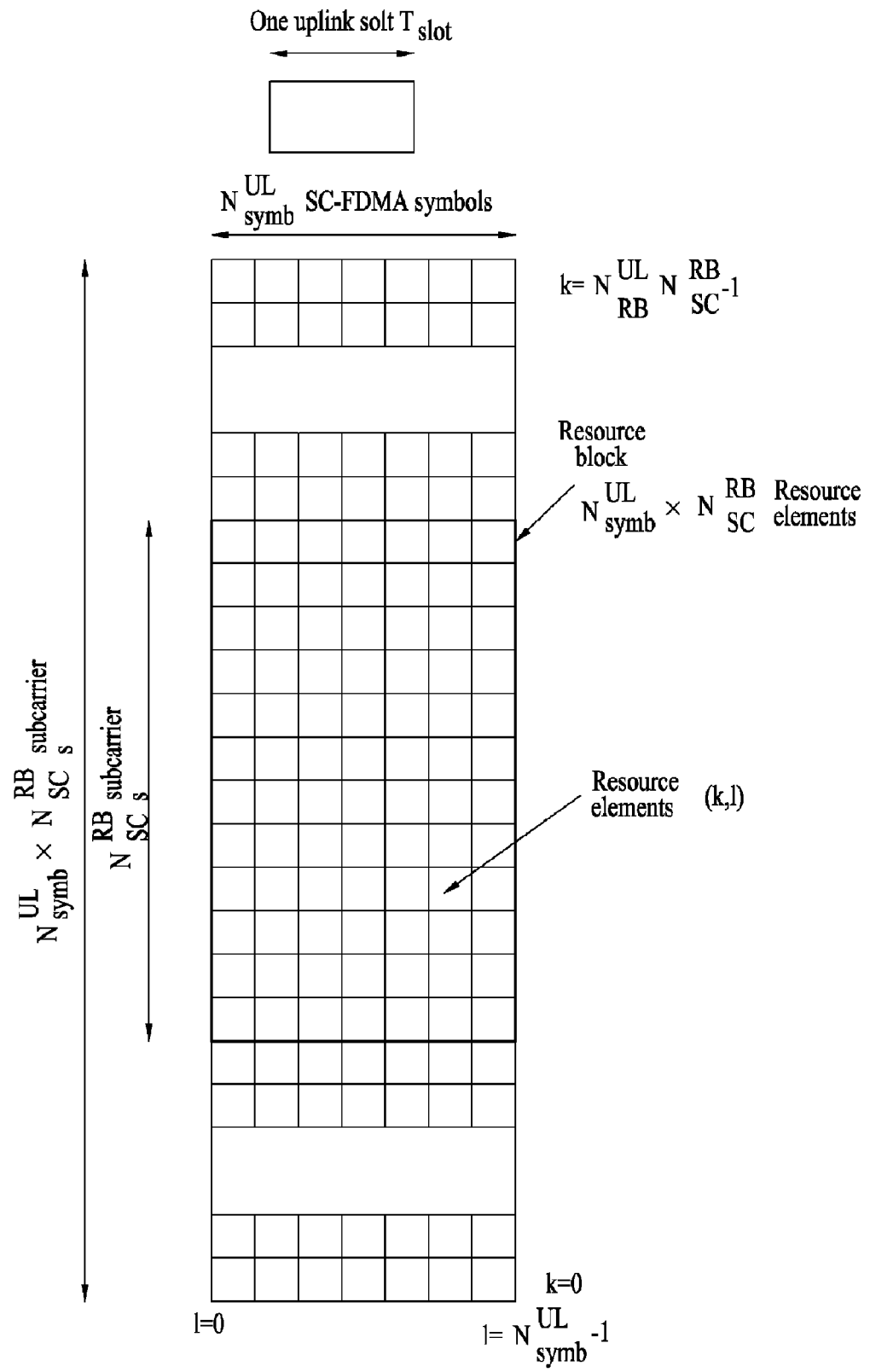
FIG. 2 is a diagram of an uplink time-frequency resource grid structure used for such a mobile communication system as 3GPP ($3^{rd}$ generation partnership project) LTE (long term evolution) system.

FIG. 2 is a diagram of an uplink time-frequency resource grid structure used for such a mobile communication system as 3GPP ($3^{rd}$ generation partnership project) LTE (long term evolution) system.

Figure 3:
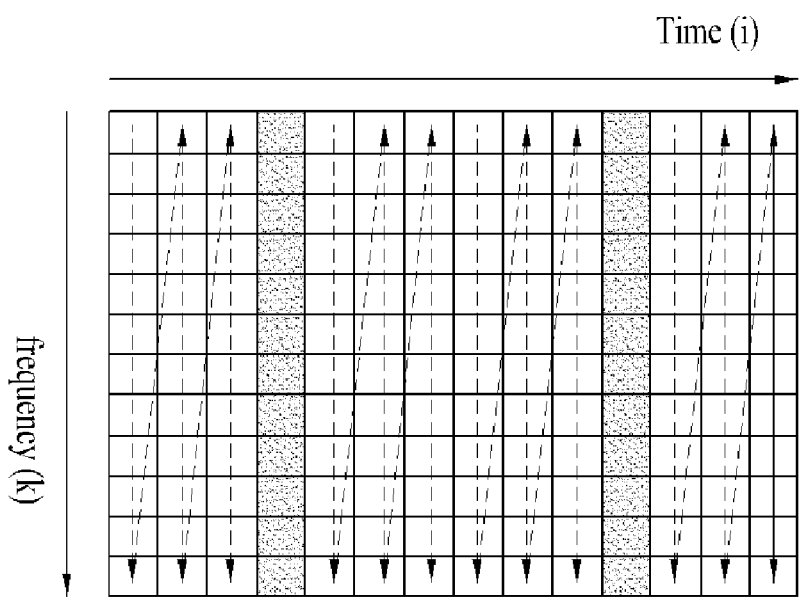
FIG. 3 and FIG. 4 are diagrams of examples for a method of mapping analog CSI feedback information according to the present invention.

Referring to FIG. 2, an uplink signal transmitted in each slot can be depicted by such a resource grid, as shown in FIG. 3, constructed with $N_{RB}^{UL} N_{SC}^{RB}$ subcarriers and $N_{symb}^{UL}$ OFDM symbols. In this case, the 여기서, $N_{RB}^{UL}$ indicates the number of resource blocks (RBs) in uplink, the $N_{SC}^{RB}$ indicates the number of subcarriers constructing one RB, and the $N_{symb}^{UL}$ indicates the number of OFDM symbols in one uplink slot. A size of the $N_{RB}^{UL}$ varies according to an uplink transmission bandwidth configured within a cell and should meet $N_{RB}^{min,UL} \leq N_{RB}^{UL} \leq N_{RB}^{max,UL}$. In this case, the $N_{RB}^{min,UL}$ indicates a smallest uplink bandwidth supported by a wireless communication system, and the $N_{RB}^{max,UL}$ indicates a biggest uplink bandwidth supported by the wireless communication system. It can be $N_{RB}^{min,UL}=6$ and $N_{RB}^{max,UL}=110$, by which the present invention is non-limited. The number of SC-FDMA symbols included within one slot can vary according to a length of a cyclic prefix (CP) and a subcarrier interval.

Each element within a resource grid is called a resource element (RE) and can be uniquely identified by an index pair (k, i) within a slot. In this case, the k indicates an index in frequency domain and the i indicates an index in time domain. The k is set to one of 0, ..., and $N_{RB}^{UL}N_{SC}^{RB}-1$. The i is set to one of 0, ..., and $N_{symb}^{UL}-1$.

Physical Resource Block (PRB) is defined as $N_{symb}^{UL}$ consecutive SC-FDMA symbols in time domain and $N_{SC}^{RB}$ consecutive subcarriers in frequency domain. In this case, the $N_{symb}^{UL}$ and the $N_{SC}^{RB}$ can be set to values determined in advance. For instance, the $N_{symb}^{UL}$ and the $N_{SC}^{RB}$ can be given as Table 2. Therefore, one PRB in uplink can be constructed with $N_{symb}^{UL} \times N_{SC}^{RB}$ resource elements. Moreover, one PRB corresponds to one slot in time domain or to 180 kHz in frequency domain. The PRB number $n_{PRB}$ in frequency domain and the resource element index (k,l) in slot can meet the relation of $$n_{PRB} = \left\lfloor \frac{k}{N_{sc}^{RB}} \right\rfloor.$$

TABLE 1

| Configuration | $N_{SC}^{RB}$ | $N_{symb}^{UL}$ |
|---|---|---|
| Normal cyclic prefix | 12 | 1 |
| Extended cyclic prefix | 12 | 6 |

In the following description, explained are embodiments for an user equipment to transmit a channel element by mapping it to an allocated uplink resource (e.g., physical uplink shared channel (PUSCH)) based on the aforesaid resource structure used in the LTE system.

First of all, a base station is able to allocate an uplink resource (e.g., physical uplink shared channel (PUSCH)) to an user equipment. In this case, a basic unit of the allocated PUSCH may include 1 resource block. According to the present invention, the base station may periodically allocate the PUSCH to the user equipment. This method can reduce more overhead rather than a non-periodic method by event-triggering.

A user equipment maps components of channel matrix or covariance matrix R, which corresponds to at least one of a wideband including a plurality of subbands, each subband, M best subbands and average best M subband, to PUSCH and then transmit the mapped components via the PUSCH. In doing so, in order for the user equipment to perform the transmission via the PUSCH, it is necessary to define a mapping pattern in advance. This resource mapping may be preferentially performed consecutively on time or frequency axis.

A method for a user equipment to performing mapping on PUSCH may correspond to one of several patterns.

Figure 4:
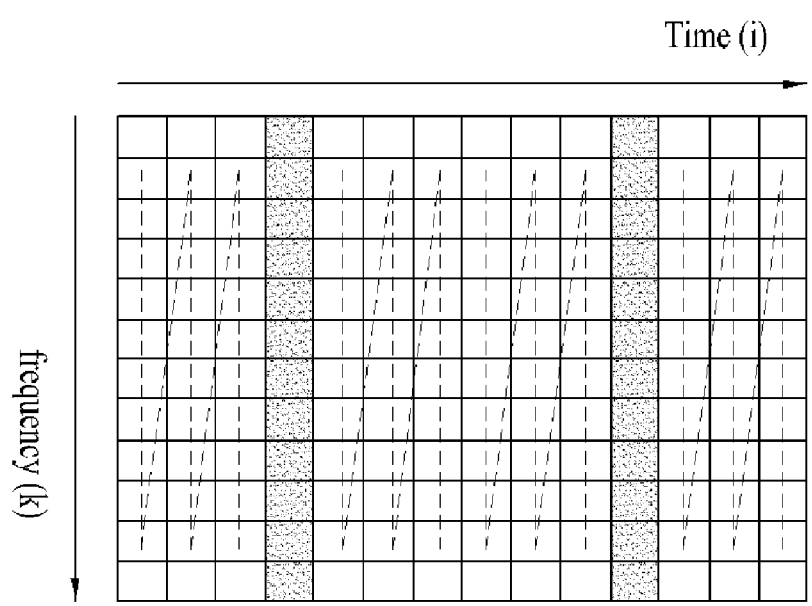

First of all, regarding a first mapping pattern, the following description is made with reference to FIG. 3 and FIG. 4. An user equipment may map components of a plurality of channel matrix H or covariance matrix R to be transmitted consecutively on a time or frequency axis. This mapping method is advantageous in sending a considerable amount of CSI feedback information by minimizing overhead of an uplink resource for CSI feedback information transmission. Yet, since the components of the channel matrix H or the covariance matrix R consist of various values, it may a cause a problem that a peak to average power ratio (PAPR) is raised.

FIG. 3 and FIG. 4 are diagrams of examples for a method of mapping analog CSI feedback information according to the present invention.

Referring to FIG. 3, an user equipment is able to map components of a plurality of channel matrix H or covariance matrix R to be transmitted consecutively on a frequency axis. In this case, the components of channel matrix H or covariance matrix may be mapped to the rest of symbols except mid-symbol (e.g., 4$^{th}$ symbol, 11$^{th}$ symbol) (i.e., symbol in a slashed region) of each slot including a reference symbol (RS) among 14 symbols. For instance, the components of channel matrix H or covariance matrix are consecutively mapped on a frequency axis from a symbol (i=0) and then may be consecutively mapped again on the frequency axis from a symbol (i=1). And, mapping may not be performed on the symbol (i=4 or i=11) including the reference symbol.

Referring to FIG. 4, a user equipment may consecutively map the components of channel matrix H or covariance matrix except specific subcarriers (k=1, k=12). FIG. 4, mapping may not be performed on the symbol (i=4 or i=11) including the reference symbol.

According to a second mapping pattern, if the number of components to be transmitted for one channel matrix H or one covariance matrix R is equal to or smaller than the number (e.g., 12) of subcarriers or symbols constructing one resource block, one channel matrix H or one covariance matrix R may be mapped per symbol (in this case, mapping is preferentially performed on a frequency axis) or per subcarrier (in this case, mapping is preferentially performed on a time axis). After each of the components has been mapped, the user equipment nulls a remaining part of each symbol or subcarrier, or may randomly insert a garbage value for lowering PAPR of the corresponding symbol or subcarrier in the remaining part of each symbol or subcarrier. When there are two transmitting antennas of a base station, it is able to map at least one channel matrix H or at least one covariance matrix R per symbol or subcarrier.

A third mapping pattern according to the present invention is explained with reference to FIG. 5 and FIG. 6 as follows.

Figure 5:
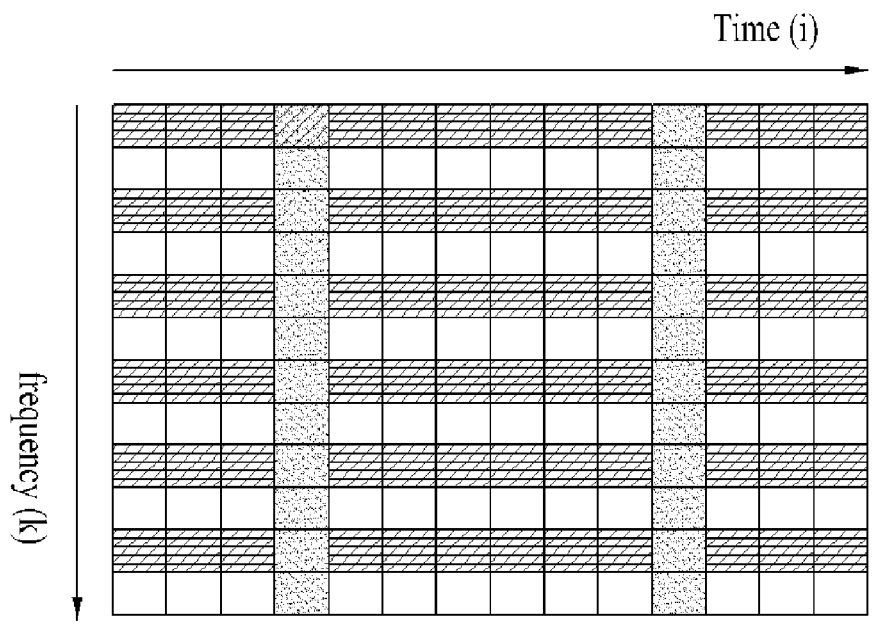
FIG. 5 and FIG. 6 are diagrams of examples for a method of mapping analog CSI feedback information according to the present invention.
Figure 6:
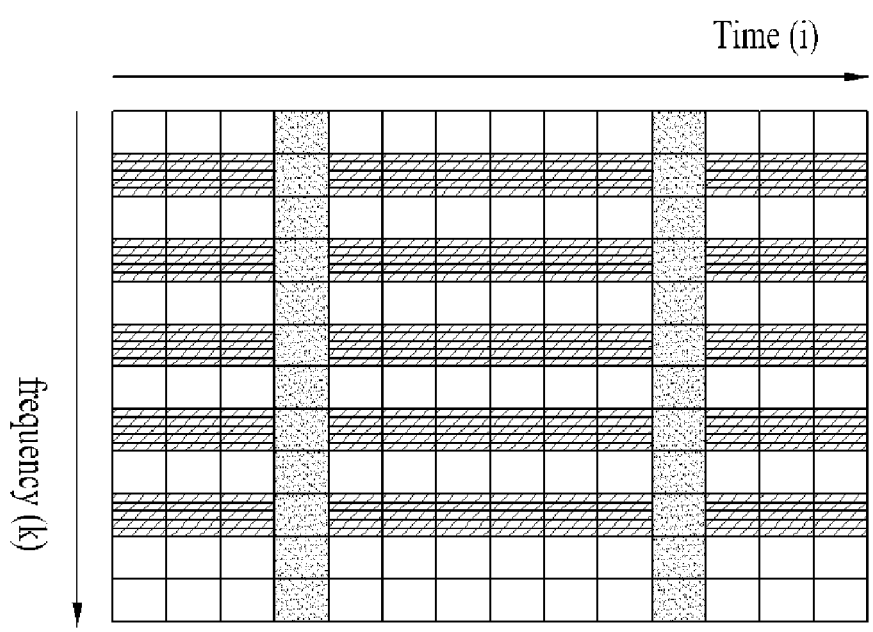

FIG. 5 and FIG. 6 are diagrams of examples for a method of mapping analog CSI feedback information according to the present invention.

According to a third mapping pattern, a user equipment may map each component of channel matrix H or covariance matrix R in a specific pattern to an uplink resource (e.g., PSUCH). The user equipment may null a non-mapped part or insert a garbage value for lowering PAPR of the symbol or subcarrier corresponding to the non-mapped part. Referring to FIG. 5, when the user equipment performs mapping preferentially on a frequency axis according to this specific mapping pattern, it is able to map the matrix component to an odd-numbered subcarrier. If so, the user equipment may null an even-numbered subcarrier or insert a garbage value for lowering PAPR in the even-numbered subcarrier. Alternatively, referring to FIG. 6, an user equipment may map a matrix component to an even-numbered subcarrier. If so, the user equipment may null an even-numbered subcarrier or insert a garbage value for lowering PAPR in the even-numbered subcarrier.

Meanwhile, in order to raise a reception rate of analog CSI feedback information at a base station, a matrix component may be mapped to a specific region having a good reception rate, and a non-mapped part may be nulled or a garbage value may be inserted in the non-mapped part. For a relay backhaul link, matrix components may be mapped to parts of 1 resource block except first and last symbols thereof. A non-mapped part may be nulled or a garbage value may be inserted in the non-mapped part.

In addition to this, the following method can be taken into consideration. First of all, a user equipment maps matrix components to a PUSCH region. A non-mapped part may be nulled or a garbage value for lowering PAPR of a symbol or subcarrier corresponding to non-mapped parts may be inserted in the non-mapped part by the user equipment nulls.

Assume that an user equipment receives an allocation of an uplink resource (e.g., 1 resource block of PUSCH) from a base station in order to transmit analog CSI feedback information. And, assume an MIMO system including a base station having 4 transmitting antennas. In order to meet the single carrier property, analog CSI may be mapped to the rest of symbols except mid-symbols (e.g., $4^{th}$ symbol, $11^{th}$ symbol, etc.) of each slot including a reference symbol (RS) among 14 symbols. In particular, the user equipment may map components of channel matrix H or covariance matrix R to a PUSCH region. Assume a case that the covariance matrix R is transmitted.

The covariance matrix component mapped to each resource element can be normalized through a total power sum of the rest symbols except the symbol including a reference symbol. Each symbol may have a different power level according to the covariance matrix component. Therefore, in case of performing normalization with each symbol power, each symbol has a different η value. To solve the problem of difference, normalization may be performed using a power sum of the total symbols. The covariance matrix in the MIMO system having 4 transmitting antennas can be represented as 4×4 matrix shown in Formula 3.

$$R(i,k) = \begin{bmatrix} r_{1,1}(i,k) & r_{1,2}(i,k) & r_{1,3}(i,k) & r_{1,4}(i,k) \\ r_{2,1}(i,k) & r_{2,2}(i,k) & r_{2,3}(i,k) & r_{2,4}(i,k) \\ r_{3,1}(i,k) & r_{3,2}(i,k) & r_{3,3}(i,k) & r_{3,4}(i,k) \\ r_{4,1}(i,k) & r_{4,2}(i,k) & r_{4,3}(i,k) & r_{4,4}(i,k) \end{bmatrix}$$ [Formula 3]

In Formula 3, the matrix is symmetric with reference to a diagonal term. Therefore, although a user equipment transmits a diagonal term and an upper triangle part of a covariance matrix, a base station is able to acquire sufficient information about channel. In particular, the user equipment may just feed back 10 components (i.e., a slashed part in Formula 3) corresponding to the triangle part in 4×4 matrix per channel.

According to a mapping method of covariance matrix components, like the first mapping pattern method of performing mapping consecutively on frequency axis in FIG. 3 and FIG. 4, one channel may be mapped to each symbol. For instance, in case of the MIMO system having 4 transmitting antennas, as shown in FIG. 4, 10 channel components are mapped to one symbol, and a remaining part is nulled or a garbage value for lowering PAPR may be inserted in the remaining part. Alternatively, like the third mapping pattern, a user equipment may map the components of the channel matrix H or the covariance matrix R to PUSCH in specific pattern. The user equipment nulls a part remaining after the mapping or may randomly insert a garbage value for lowering PAPR of a symbol or subcarrier corresponding to the remaining part.

Regarding this specific pattern, in case of mapping on a frequency axis, referring to FIG. 5, matrix components are mapped to an odd-numbered subcarrier. An even-numbered subcarrier remaining after the mapping is nulled or a garbage value for lowering PAPR may be inserted in the remaining even-numbered subcarrier. Alternatively, referring to FIG. 7, matrix components are mapped to an even-numbered subcarrier. An odd-numbered subcarrier remaining after the mapping is nulled or a garbage value for lowering PAPR may be inserted in the remaining odd-numbered subcarrier. Alternatively, referring to FIG. 6, one covariance matrix, which can be represented as 10 components, is mapped and transmitted in a manner of being mapped to an even-numbered subcarrier in a manner of being divided into 2 symbols by 5 components each. In doing so, a part remaining after the mapping is nulled or a garbage value for lowering PAPR can be inserted in the remaining part. In order to raise a reception rate of analog CSI feedback information at a base station, a matrix component is mapped to a specific region having a good reception rate and a remaining non-mapped part is nulled or a garbage value for lowering PAPR may be inserted in the remaining non-mapped part.

FIGS. 7 to 11 are diagrams of examples for a method of mapping analog CSI feedback information according to the present invention. FIGS. 12 to 16 are diagrams of examples for a method of mapping analog CSI feedback information preferentially on a time axis according to the present invention.

Figure 7:
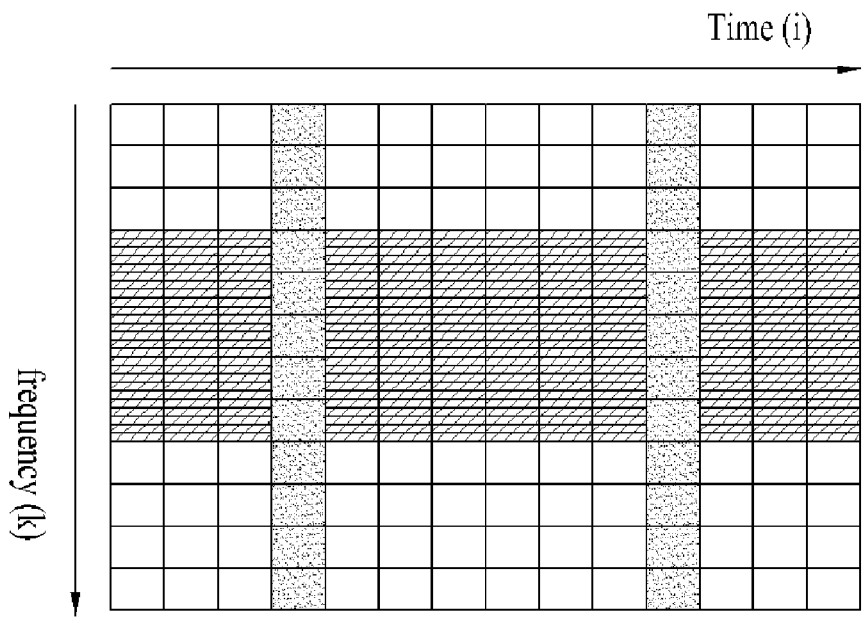
FIGS. 7 to 11 are diagrams of examples for a method of mapping analog CSI feedback information according to the present invention.

Assuming that a middle part on subcarrier in one resource block has a good reception rate, mapping may be performed on the matrix component values as shown in FIG. 4 or FIG. 7. Moreover, mapping may be preferentially performed on the matrix component values along a time axis, as shown in FIGS. 12 to 16.

Assume that an user equipment receives an allocation of an uplink resource (e.g., 1 resource block of PUSCH) from a base station in order to transmit analog CSI feedback information. And, assume an MIMO system including a base station having 8 transmitting antennas. The covariance matrix in the MIMO system having 8 transmitting antennas may be represented as Formula 4.

$$R(i,k) = \begin{bmatrix} r_{1,1}(i,k) & r_{1,2}(i,k) & \cdots & r_{1,8}(i,k) \\ r_{2,1}(i,k) & r_{2,2}(i,k) & \cdots & r_{2,8}(i,k) \\ \vdots & \vdots & \ddots & \vdots \\ r_{8,1}(i,k) & r_{8,2}(i,k) & \cdots & r_{8,8}(i,k) \end{bmatrix}$$ [Formula 4]

Formula 4 is represented as 8×8 matrix, the covariance matrix is symmetric with reference to a diagonal term. Therefore, although an user equipment transmits a diagonal term and an upper triangle part of the covariance matrix, a base station is able to acquire sufficient information about channel. In particular, the user equipment may just feed back 36 components per channel in the 8×8 matrix.

In the covariance matrix component mapping method, there is a first mapping pattern for performing mapping on frequency axis consecutively, as shown in FIG. 3. If the number of components constructing one matrix exceeds the number of subcarriers or symbols, the matrix components may be mapped to several symbols or subcarriers in a manner of being separated from each other.

Figure 8:
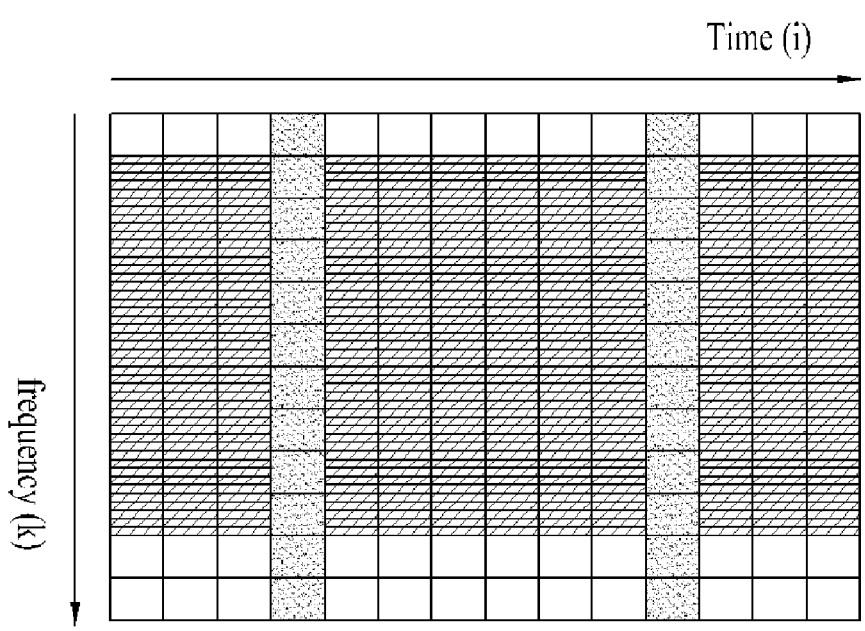
Figure 12:
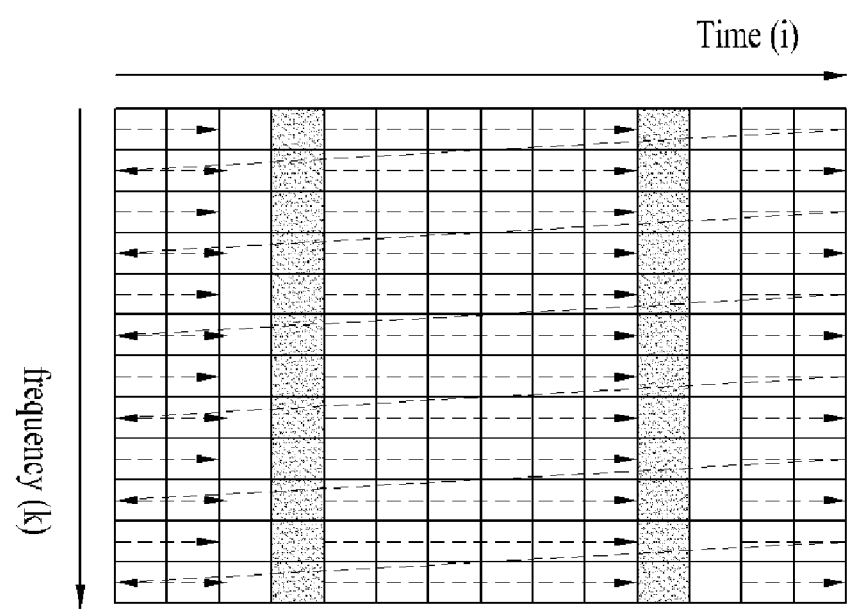
FIGS. 12 to 16 are diagrams of examples for a method of mapping analog CSI feedback information preferentially on a time axis according to the present invention.
Figure 13:
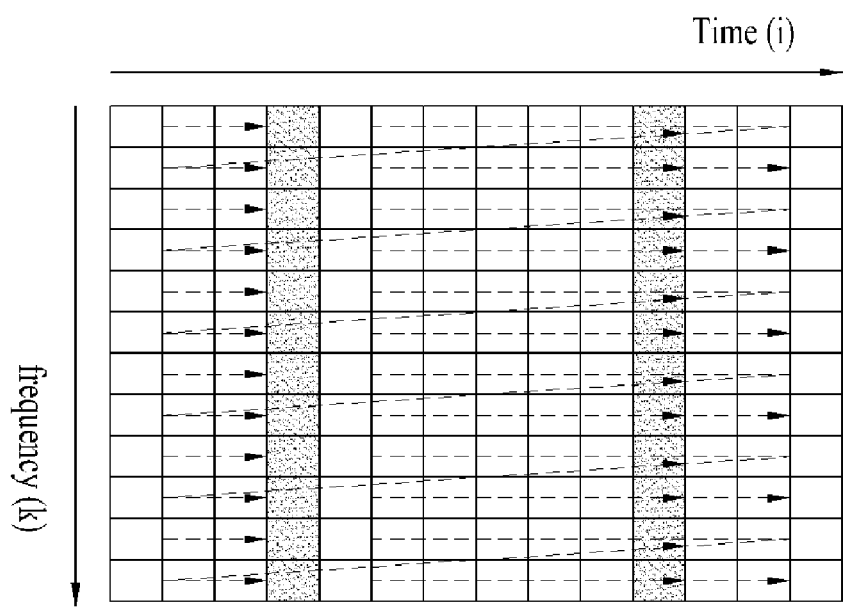
Figure 14:
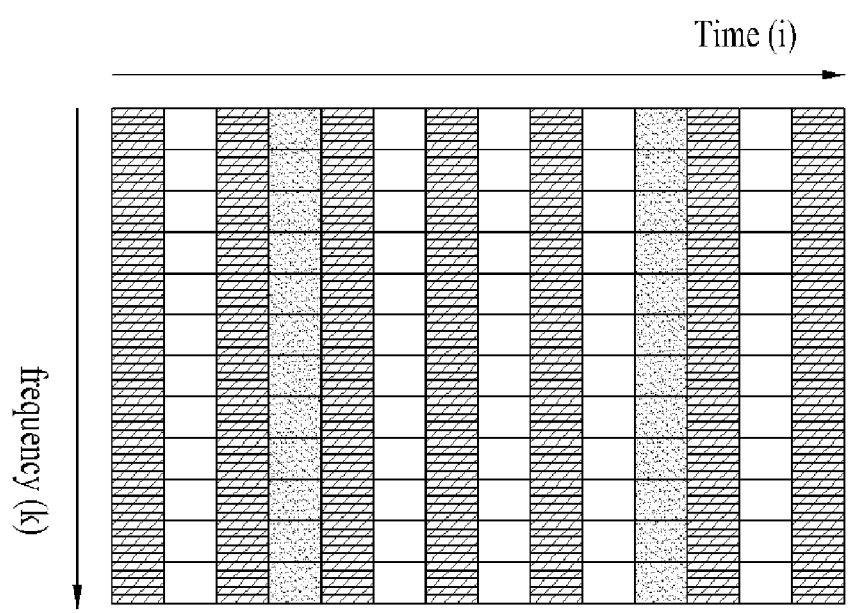
Figure 15:
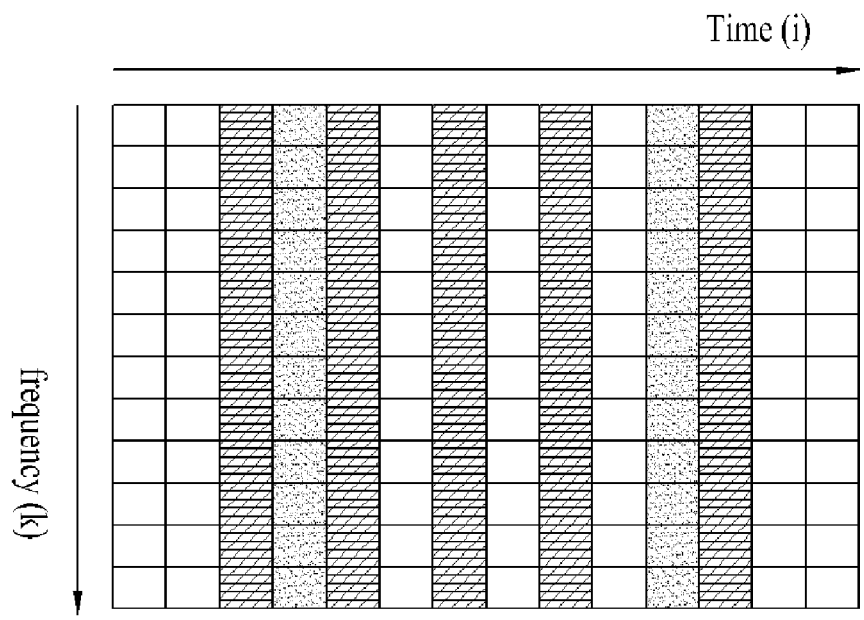
Figure 16:
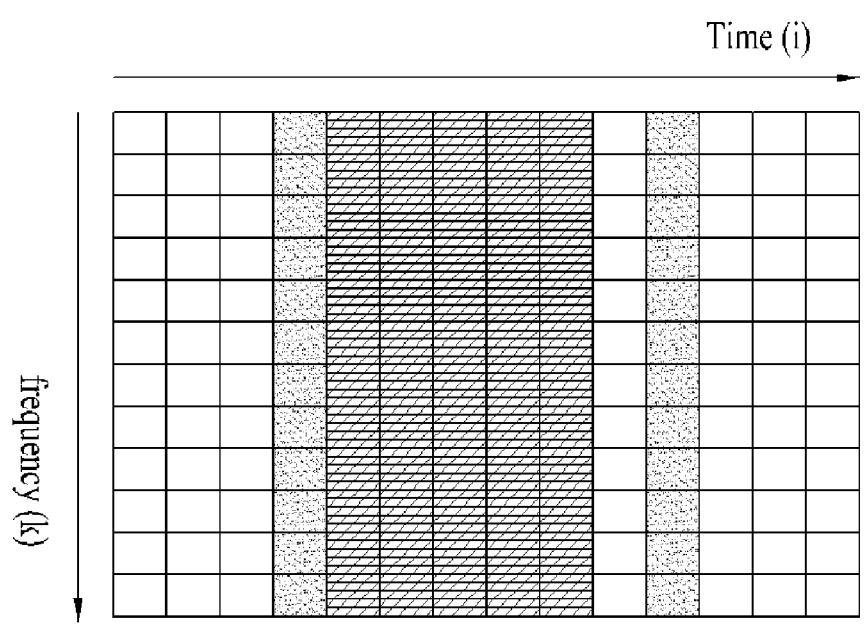
Figure 17:
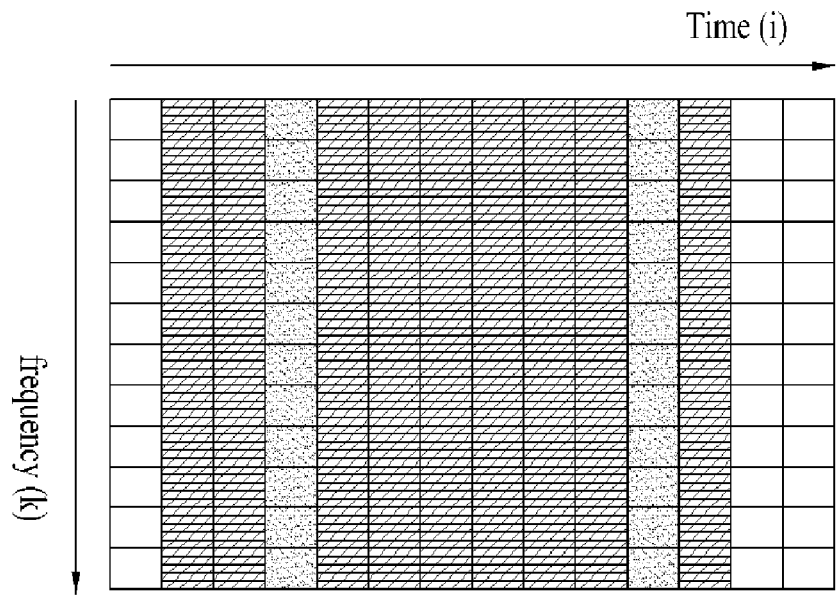
FIGS. 17 to 20 are diagrams of examples for a method of mapping analog CSI feedback information preferentially on a frequency axis according to the present invention.
Figure 18:
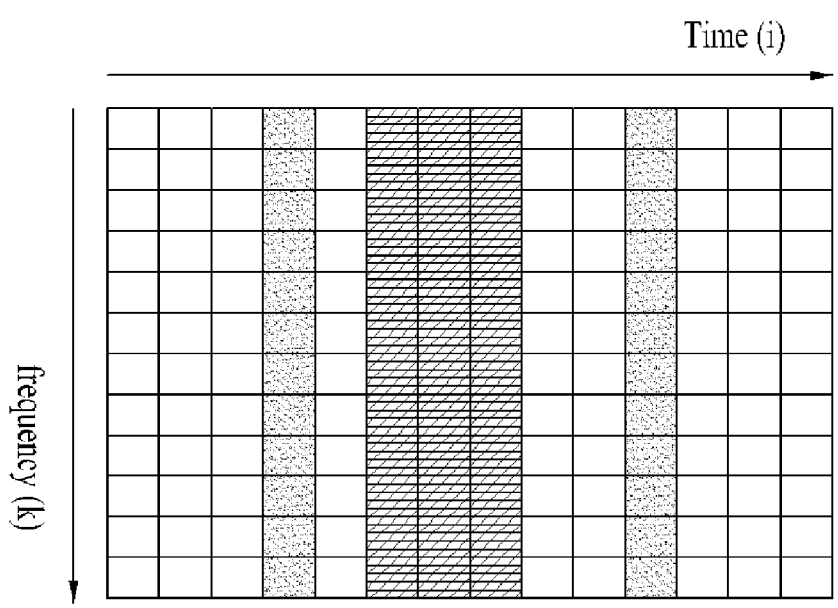
Figure 19:
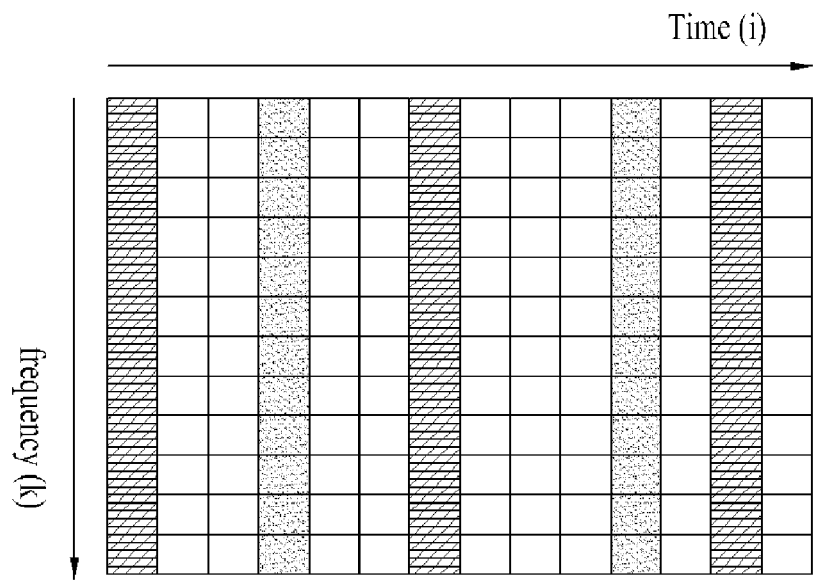
Figure 20:
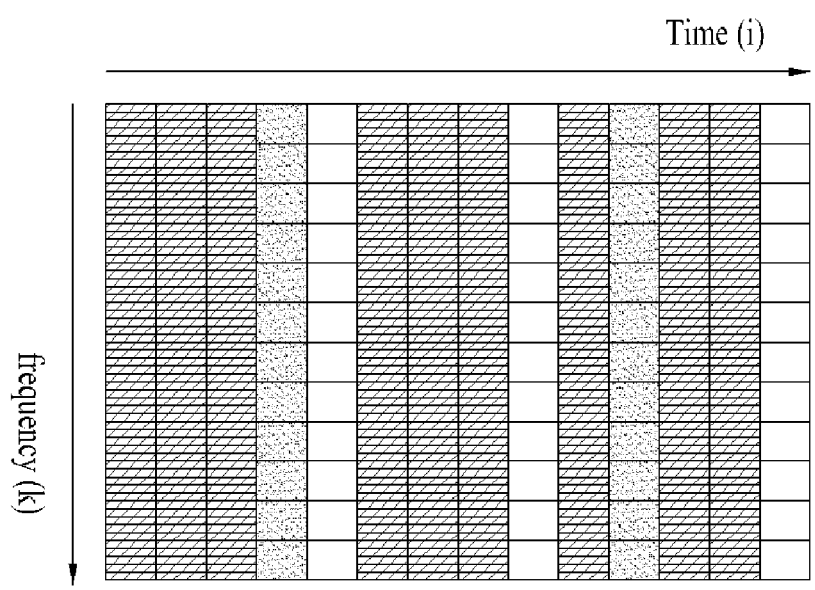

For instance, in an MIMO system having 8 transmitting antennas, referring to FIG. 8, a user equipment may map 36 channel components to 4 symbols by 9 components each and remaining non-mapped part may be nulled or a garbage value for lowering PAPR may be inserted in the remaining non-mapped part. Alternatively, in case of performing mapping on frequency axis preferentially, referring to FIG. 5, matrix components may be mapped to an odd-numbered subcarrier and an even-numbered subcarrier is nulled or a garbage value for lowering PAPR may be inserted in the even-numbered subcarrier. Alternatively, referring to FIG. 6, matrix components may be mapped to an even-numbered subcarrier and an odd-numbered subcarrier is nulled or a garbage value for lowering PAPR may be inserted in the odd-numbered subcarrier. Alternatively, mapping can be performed on time axis preferentially, as shown in FIG. 12 or FIG. 17.

According to another embodiment of the present invention, assume that an user equipment receives an allocation of an uplink resource (e.g., 1 resource block of PUSCH) from a base station in order to transmit analog CSI feedback information. And, assume an MIMO system including a base station having 2 transmitting antennas. The covariance matrix in the MIMO system having 2 transmitting antennas can be represented as Formula 5.

$$R(i,k) = \begin{bmatrix} r_{1,1}(i,k) & r_{1,2}(i,k) \\ r_{2,1}(i,k) & r_{2,2}(i,k) \end{bmatrix}$$ [Formula 5]

Formula 5 is represented as 2×2 matrix, the covariance matrix is symmetric with reference to a diagonal term. Therefore, although an user equipment transmits a diagonal term and an upper triangle part (slashed region) of the covariance matrix, a base station is able to acquire sufficient information about channel. In particular, the user equipment may just feed back 3 components per channel in the 2×2 matrix.

FIGS. 17 to 20 are diagrams of examples for a method of mapping analog CSI feedback information preferentially on a frequency axis according to the present invention.

Figure 9:
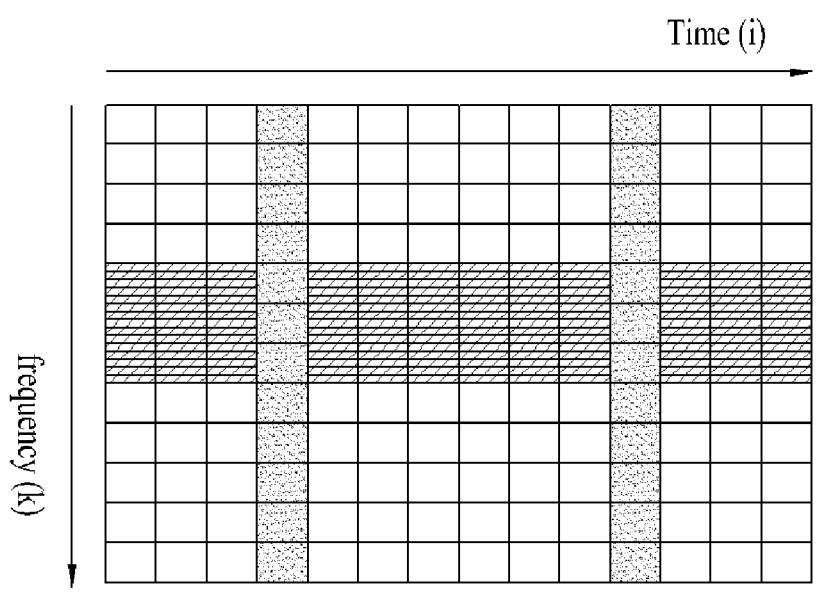
Figure 10:
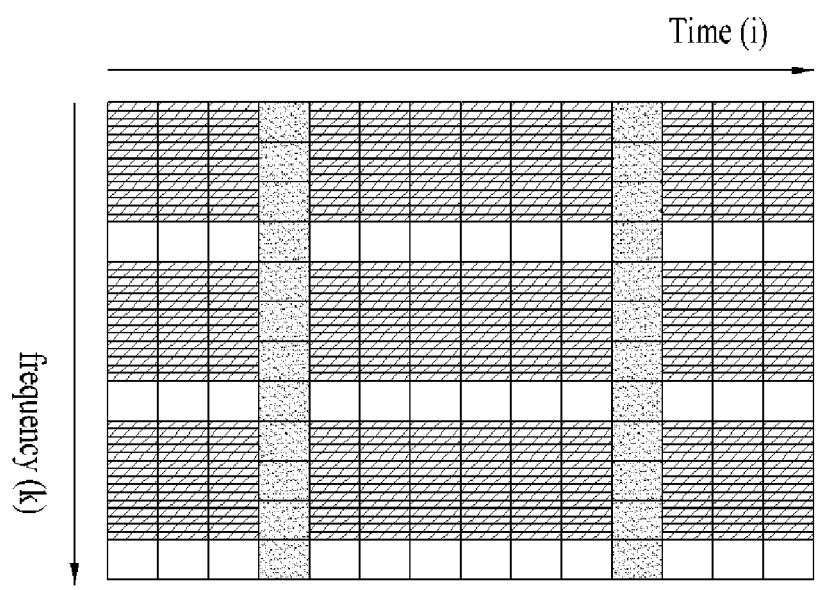

According to a mapping method of covariance matrix components, like the first mapping pattern method of performing mapping consecutively on frequency axis in FIG. 3 and FIG. 4, one channel may be mapped to each symbol. For instance, in case of the MIMO system having 2 transmitting antennas, as shown in FIG. 9 and FIG. 10, 3 channel components may be mapped to one symbol, and a remaining non-mapped part may be nulled or a garbage value for lowering PAPR may be inserted in the remaining non-mapped part. Alternatively, like the third mapping pattern, an user equipment is able to map the components of the channel matrix H or the covariance matrix R to PUSCH in specific pattern. The user equipment nulls a remaining non-mapped or may randomly insert a garbage value for lowering PAPR of symbol or subcarrier corresponding to the remaining non-mapped part.

Figure 11:
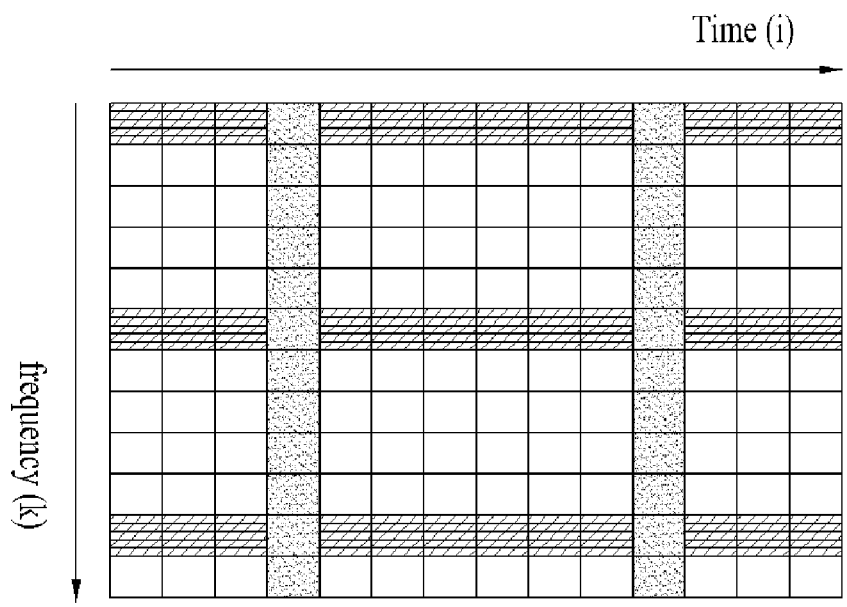

Regarding this specific pattern, in case of a preferential mapping on a frequency axis, referring to FIG. 5, matrix components may be mapped to an odd-numbered subcarrier. An even-numbered subcarrier may be nulled or a garbage value for lowering PAPR may be inserted in the remaining even-numbered subcarrier. Alternatively, referring to FIG. 7, matrix components are mapped to an even-numbered subcarrier. An odd-numbered subcarrier may be nulled or a garbage value for lowering PAPR may be inserted in the remaining odd-numbered subcarrier. Alternatively, 3 covariance matrixes, each of which may be represented as 3 components, are carried on one symbol, as shown in FIG. 11, and a remaining non-mapped part may be nulled or a garbage value may be inserted in the remaining non-mapped part. Alternatively, transmission of analog CIS feedback information can be performed in a manner of preferential mapping on time axis, as shown in FIG. 12 and FIGS. 18 to 20.

According to another embodiment of the present invention, an user equipment transmits analog CIS feedback information using an allocated PUSCH. Alternatively, a user equipment may transmit analog CIS feedback information using SRS (sounding reference signal) symbol.

Figure 21:
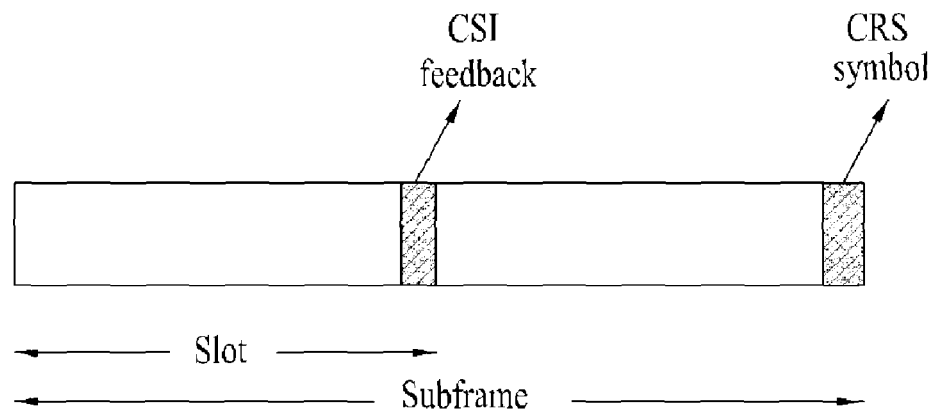
FIG. 21 is a diagram of an example for a frame structure including CSI feedback information and CRS symbol according to the present invention.

FIG. 21 is a diagram of an example for a frame structure including CSI feedback information and CRS symbol according to the present invention.

Referring to FIG. 21, if a first slot may be allocated in a subframe including a CRS symbol, CSI feedback may be transmitted in a last slot of the first slot. Alternatively, as well as the method of allocating the last symbol of the first slot in addition, a method of transmitting CSI feedback information in a specific subframe of a previous CRS transmission periodicity instead of the CRS transmission is available. Alternatively, a CSI feedback information transmission periodicity is allocated in a manner of being set to a transmission periodicity shorter than a previous CRS transmission periodicity and CSI feedback information can be transmitted in a CRS symbol of a subframe having the additionally allocated periodicity. For instance, when a user equipment receiving an allocation of 2 ms CRS transmission periodicity transmits CSI feedback information, 1 ms CRS transmission periodicity is allocated and CRS symbol and CSI feedback information can be alternately performed on a CRS symbols of a corresponding subframe every 1 ms.

The above-described method of mapping a resource for CSI feedback transmission is performed in a manner of mapping analog CSI to the rest of symbols except a mid-symbol (e.g., $4^{th}$ symbol, $11^{th}$ symbol) of each slot including a reference symbol among 14 symbols. Yet, a corresponding resource can be entirely used for the CSI feedback transmission without sending a reference symbol. The problem of channel estimation, which is caused in case of not sending the reference symbol, can be solved in a manner of separating each component of a channel matrix H or a covariance matrix R into a real value and an imaginary value and then sending the same or different value repeatedly to discriminate signs (e.g., +, −) of the corresponding values from each other. The aforesaid mapping rule may ally to this mapping rule.

Assume an MIMO system having 2 transmitting antennas. A covariance matrix in the MIMO system having 2 transmitting antennas can be represented as Formula 6.

$$R(i,k) = \begin{bmatrix} a & b \\ x & c \end{bmatrix}$$ [Formula 6]

Formula 6 is represented as 2×2 matrix, the covariance matrix is symmetric with reference to a diagonal term. Therefore, although an user equipment transmits a diagonal term and an upper triangle part (slashed region) of the covariance matrix, a base station is able to acquire sufficient information about channel. In particular, the user equipment may just feed back 3 components a, b and c per channel in the 2×2 matrix expressed in the formula 6. The diagonal term is constructed with real values only, at least 2 resource elements are required for sending the real values, and at least 3 resource elements are required for sending real and imaginary values of off-diagonal term. Hence, 8 resource elements are necessary to send the 2×2 matrix without reference symbol.

Figure 22:
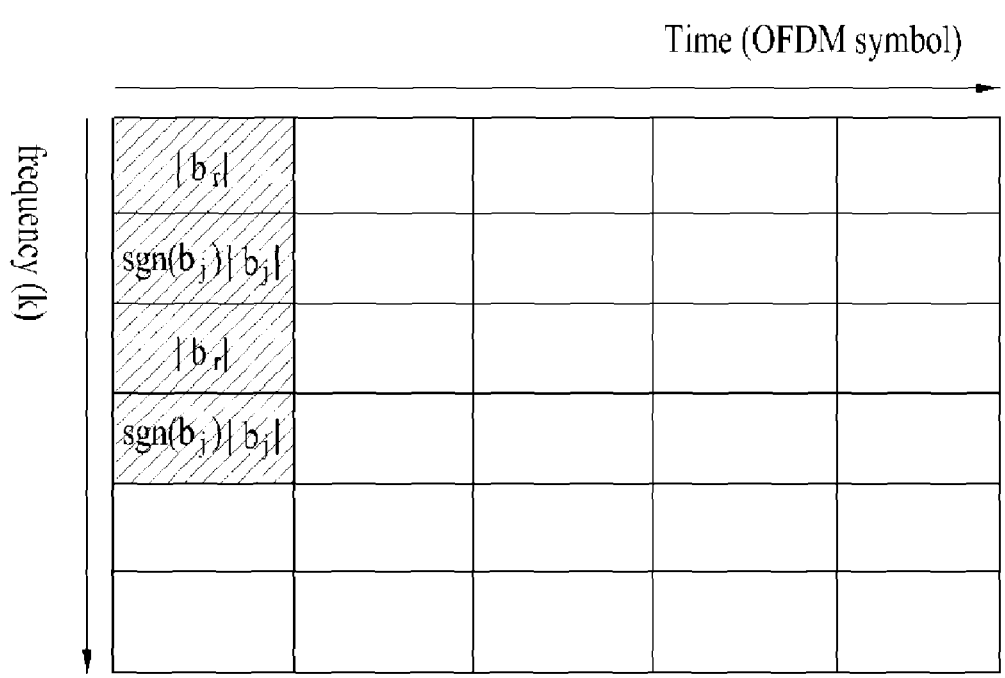
FIG. 22 is a diagram of an example for a method of mapping a covariance matrix component value.

FIG. 22 is a diagram of an example for a method of mapping a covariance matrix component value.

Referring to FIG. 22, a value mapped to 4 resource elements to transmit $b=b_r+jb_j$, which is a component of (1, 2), can become $|b_r|$,$sgn(b_r)|b_r|$,$|b_j|$,$sgn(b_j)|b_j|$ shown in FIG. 22 for example.

In the above CSI feedback mapping method, embodiments (2Tx, 4Tx, 8Tx) are described based on the covariance matrix R. Moreover, the present invention is applicable to various channel matrixes H according to various combinations of transmitting and receiving antennas.

Figure 23:
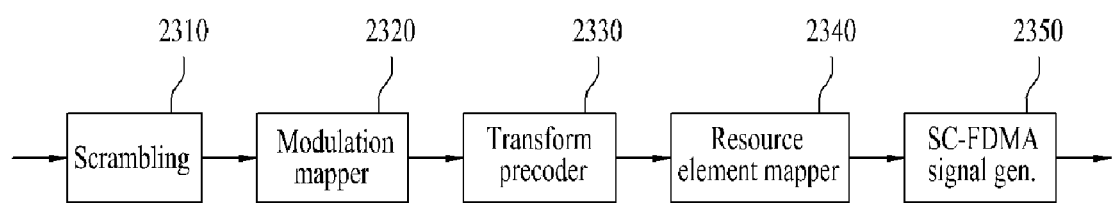
FIG. 23 is a block diagram for describing a signal processing process for a user equipment to transmit an uplink signal.

FIG. 23 is a block diagram for describing a signal processing process for a user equipment to transmit an uplink signal.

Referring to FIG. 23, in order to transmit an uplink signal, a scrambling module 2310 of a user equipment is able to scramble a transmission signal using a user equipment specific scramble signal. This scrambled signal is inputted to a modulation mapper 2320 and is then modulated in to a complex symbol of BPSK, QPSK or 16 QAM system according to a type of the transmission signal or a channel state. Subsequently, the modulated complex symbol is diffused by a transform precoder 2330 corresponding to DFT diffusion and is then inputted to a resource element mapper 2340. The resource element mapper 2340 is able to map the complex symbol to a time-frequency resource element that will be used for real transmission. The above-processed signal enters an SC-FDMA signal generator 2350 can is then transmitted to a base station via antenna.

Figure 24:
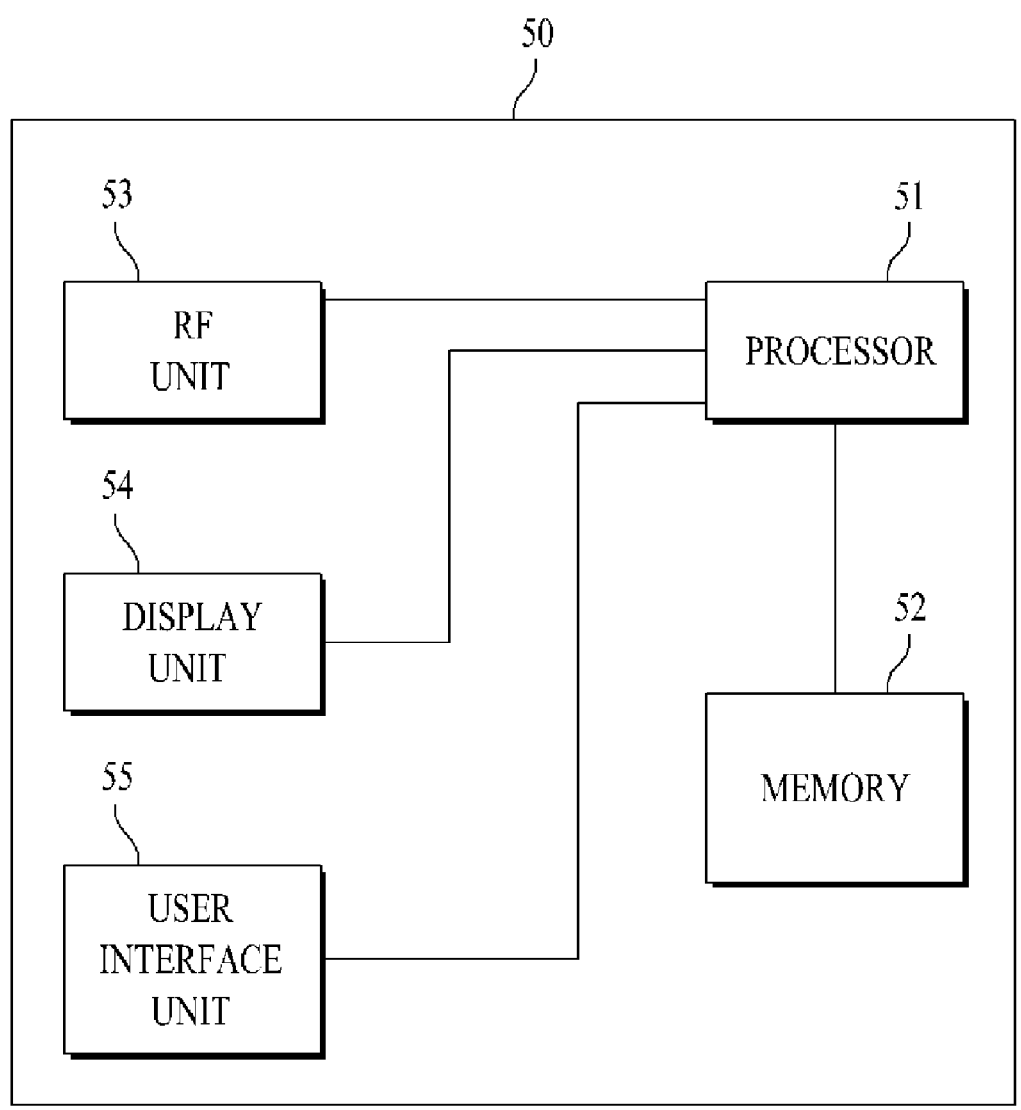
FIG. 24 is a block diagram showing constitutional elements of a device 50.

FIG. 24 is a block diagram showing constitutional elements of a device 50 that may be either the UE or the BS of FIG. 24. Device 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If device is a UE, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals. The processor 51 may be configured to implement proposed procedures and/or method described in this application.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

The exemplary embodiments of the present invention may be achieved by various means, for example, hardware, firmware, software, or a combination thereof. In a hardware configuration, the methods according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for transmitting channel state information at a user equipment (UE) in a wireless communication system, the method comprising:

receiving an allocation of an uplink resource for transmission of the channel state information from a base station (BS);

mapping each component corresponding to diagonal elements and upper off-diagonal elements in a spatial channel matrix or a spatial channel covariance matrix to the allocated resource per symbol or subcarrier;

nulling a remaining non-mapped part or inserting a garbage value to the remaining non-mapped part; and transmitting the mapped channel state information to the base station, wherein the spatial channel matrix or the spatial channel covariance matrix is symmetric with reference to a diagonal term, and wherein the each component corresponding to the diagonal elements and the upper off-diagonal elements are mapped to an odd-numbered symbol or an odd-numbered subcarrier.

2. The method of claim 1, further comprising normalizing the mapped channels state information using a total power value of the mapped total symbol or a power value of a specific symbol having a biggest power value.

3. The method of claim 1, further comprising transmitting noise plus interference variance information for a whole bandwidth used for the transmission of the channel state information by the UE.

4. The method of claim 1, wherein the spatial channel matrix information or the spatial channel covariance matrix information relates to one of each subband, a wideband including a plurality of subbands, a prescribed number of subbands in best channel state and a plurality of subbands in best average channel state.

5. The method of claim 1, wherein the each symbol is at least one rest symbol except a symbol including a reference symbol.

6. The method of claim 1, wherein the uplink resource comprises a physical uplink shared channel (PUSCH).

7. The method of claim 6, wherein the uplink resource comprises a sounding reference signal symbol region, the sounding reference signal symbol is a last symbol of a first slot in a subframe.

8. The method of claim 1, wherein the each component corresponding to the upper off-diagonal elements in the spatial channel matrix or the spatial channel covariance matrix is mapped in a manner of being separated into a real value and an imaginary value.

9. An user equipment (UE) for transmitting channel state information in a wireless communication system, the UE comprising:
   a receiving module configured to receive an allocation of an uplink resource for transmission of the channel state information from a base station (BS);
   a processor configured to:
      map each component corresponding to diagonal elements and upper off-diagonal elements in a spatial channel matrix or a spatial channel covariance matrix to the allocated resource per symbol or subcarrier; and
      null a remaining non mapped part or insert a garbage value to the remaining non-mapped part; and
   a transmitting module configured to transmit the mapped channel state information to the base station (BS),
   wherein the spatial channel matrix or the spatial channel covariance matrix is symmetric with reference to a diagonal term, and
   wherein the each component corresponding to the diagonal elements and the upper off-diagonal elements are mapped to an odd-numbered symbol or an odd-numbered subcarrier.

10. The UE of claim 9, wherein the processor is further configured to normalize the mapped channels state information using a total power value of the mapped total symbol or a power value of a specific symbol having a biggest power value.

11. The UE of claim 9, further comprising a transmitting module for transmitting noise plus interference variance information for a whole bandwidth used for the transmission of the channel state information by the UE.

12. The UE of claim 9, wherein the spatial channel matrix information or the spatial channel covariance matrix information relates to one of each subband, a wideband including a plurality of subbands, a prescribed number of subbands in best channel state and a plurality of subbands in best average channel state.

\* \* \* \* \*